United States Patent [19]

Yamada et al.

[11] Patent Number: 4,631,590
[45] Date of Patent: Dec. 23, 1986

[54] AUTOMATIC CAMERA CONTROL SYSTEM

[75] Inventors: Kimichika Yamada; Takao Miyazaki, both of Tokyo, Japan

[73] Assignee: Clarion Co., Ltd., Tokyo, Japan

[21] Appl. No.: 827,206

[22] Filed: Feb. 4, 1986

Related U.S. Application Data

[63] Continuation-in-part of Ser. No. 515,848, Jul. 21, 1983, abandoned.

[30] Foreign Application Priority Data

| Jul. 27, 1982 | [JP] | Japan | 57-130845 |
| Jul. 27, 1982 | [JP] | Japan | 57-130846 |
| Aug. 3, 1982 | [JP] | Japan | 57-118609 |
| Aug. 4, 1982 | [JP] | Japan | 57-119199 |

[51] Int. Cl.$^4$ .................................................. H04N 5/24
[52] U.S. Cl. .................................. 358/185; 358/210; 358/335
[58] Field of Search ................ 360/18, 19.1, 27, 33.1; 358/335, 185, 209, 210; 369/24, 30

[56] References Cited

U.S. PATENT DOCUMENTS 4,244,006  1/1981  Kitahara et al. ................. 358/185 X
4,340,903  7/1982  Tamura ........................... 358/335 X Primary Examiner—Robert L. Richardson
Attorney, Agent, or Firm—Flynn, Thiel, Boutell & Tanis

[57] ABSTRACT

The TV system includes an audio tape recording apparatus, a videotape recording apparatus and a video camera device having a video camera and associated control circuits, so that the video camera device is controlled by signals reproduced by the audio tape recording apparatus or by the videotape recording apparatus and video signals from the well-controlled video camera device are recorded on a videotape by the videotape recording apparatus.

4 Claims, 12 Drawing Figures (a)          (b)

1 1 0 0 1 1 0 1 0 f₁ f₁ f₂ f₂ f₁ f₁ f₂ f₁ f₂

AUTOMATIC CAMERA CONTROL SYSTEM

This application is a continuation-in-part of U.S. Ser. No. 515,848, filed July 21, 1983 and now abandoned.

FIELD OF THE INVENTION

This invention relates to a self-control TV system capable of automatic control of a video camera device in response to control signals previously recorded on a tape and then reproduced.

BACKGROUND OF THE INVENTION

There is today widely used an audio equipment to reproduce a background music or accompaniment previously recorded on an audio tape (cassette tape, for example) in order to facilitate an amateur singer to sing in harmony with the accompaniment.

Further, there is also developed a TV system to shoot a singing posture of an amateur singer by a TV camera and immediately reproduce the scene on the monitor TV.

Such a conventional TV system, however, is not arranged to shift the TV camera during its operation to change the camera angle and other camera conditions. Therefore, the reproduced scene is so monotonous as to bore the audience.

Pictures supplied by TV broadcasting stations or by recorded videotapes on the market are taken by skilled professional cameramen with polished sense and technique. If a picture is a pop song program, for example, material to be shot is selected and changed time to time to match with the atmosphere and the rythm the song has so that the audience can fully enjoy the program. To supply such a polished picture, however, it is necessary to position a large staff at TV cameras and other equipments, and the staff must be skilled in the respective technologies. Therefore, if amateurs handle such a TV camera device, a resulting picture will be much inferior from a point of view of artistic sense and technique, and will not satisfy the audience.

SUMMARY OF THE INVENTION

It is therefore an object of the invention to overcome the above-mentioned problems.

In accordance with the invention, there is provided a self-control TV system which comprises an audio tape recording (ATR) apparatus; a videotape recording (VTR) apparatus; and a video camera device including a video camera and associated control circuits, whereby the video camera device is controlled by a self-control signal previously recorded on a tape and reproduced by the ATR apparatus or the VTR apparatus so that signals from the video camera are recorded on the tape by the VTR apparatus.

DETAILED DESCRIPTION OF THE PREFERRED EMBODIMENTS

Figure 1:
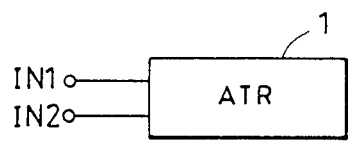
FIG. 1 is a block diagram showing the audio tape recording (ATR) apparatus employed in the self-control TV system according to the invention.

The invention will now be described in detail by way of preferred embodiments referring to the drawings.

FIG. 1 shows an audio tape recording apparatus (hereinafter called "ATR" apparatus) to be employed in the self-control TV system according to the invention. The ATR 1 has an audio signal input terminal $IN_1$ and a control signal (self-control signal) input terminal $IN_2$.

Audio signals and self-control signals are recorded on a single track or plural tracks of a video tape, respectively. The self-control signal is employed to control a video camera and control circuits associated thereto and may be recorded on a different track from or on a same track as that for the audio signals. Now assume, however, that the both signals are recorded on different tracks.

Record and reproduction of the self-control signals on and from an audio tape are enabled by converting a combination of digital signals "1" and "0" into a frequency variation including two kinds of frequencies.

Figure 2:
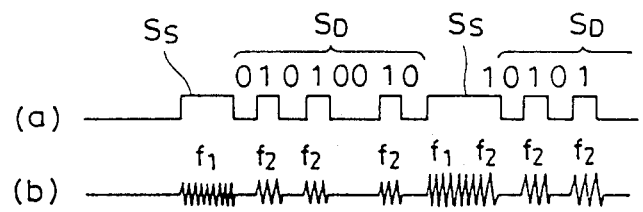
FIG. 2, consisting of (a) and (b), shows an example of signal conversion.

An example of the signal conversion is shown in FIG. 2. FIG. 2(a) shows digital signals including start signals $S_S$ and data signals $S_D$ each composing a word. The start signal $S_S$ converted to a $f_1$ Hz signal of FIG. 2(b). The data signal $S_D$ comprising "1" level components and "0" level components is converted to a series combination of $f_2$ Hz signal components corresponding to the "1" level and signalless components corresponding to the "0" level. Thus, recording in an ordinary audio band can be performed by the ATR apparatus 1.

Figure 3:
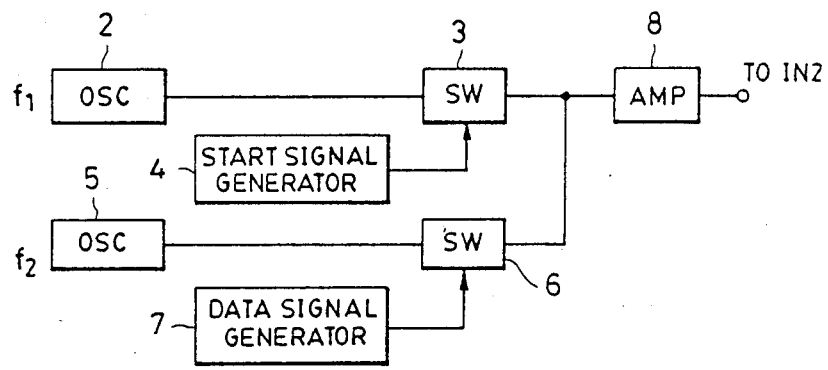
FIG. 3 is a block diagram showing how to record self-control signals.

FIG. 3 shows how to record self-control signals. Reference numeral 2 refers to a $f_1$ Hz signal oscillator, 3 to an analog switch, 4 to a start signal oscillator, 5 to a $f_2$ Hz signal oscillator, 6 to an analog switch, 7 to a data signal oscillator, and 8 to a record amplifier. When the start signal oscillator 4 is operative, the analog switch 3 is turned on, and the $f_1$ Hz signal from the $f_1$ Hz signal oscillator 2 is allowed to reach the record amplifier 8. When the data signal oscillator 7 is operative, the analog switch 6 is turned on, and the $f_2$ Hz signal from the $f_2$ Hz signal oscillator 5 is allowed to reach the record amplifier 8. When both the start signal oscillator 4 and the data signal oscillator 7 are inoperative, the both analog switches 3 and 6 are turned off so as to block the $f_1$ Hz and $f_2$ Hz signals, thus producing the signalless component.

Figure 4:
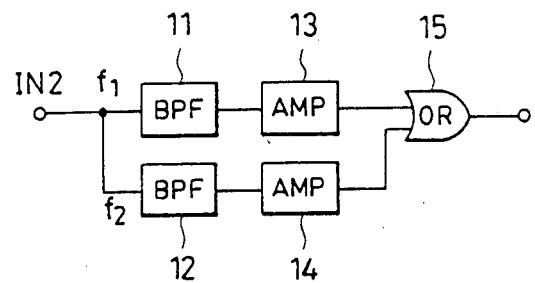
FIG. 4 is a block diagram showing how to reproduce self-control signals.

FIG. 4 shows how to reproduce the self-control signal. Reference numeral 11 refers to a $f_1$ Hz signal band pass filter, 12 to a $f_2$ Hz signal band pass filter, 13 and 14 to reproduction amplifiers, and 15 to an OR circuit. The components of the self-control signal reproduced by and supplied from the ATR apparatus 1 are filtered by the $F_1$ Hz and $f_2$ Hz signal band pass filters 11 and 12, are amplified by the reproduction amplifiers 13 and 14, and are converted to the digital signals as shown in FIG. 2(a) by the OR circuit 15.

Figure 5A:
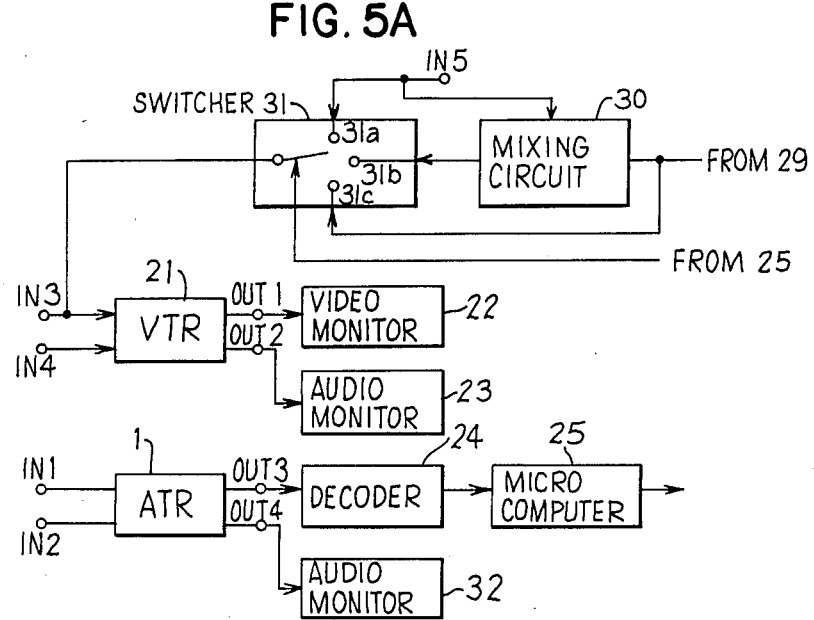
FIGS. 5A and 5B are circuit diagrams showing an embodiment of the self-control TV system employing the ATR apparatus of FIG. 1.
Figure 5B:
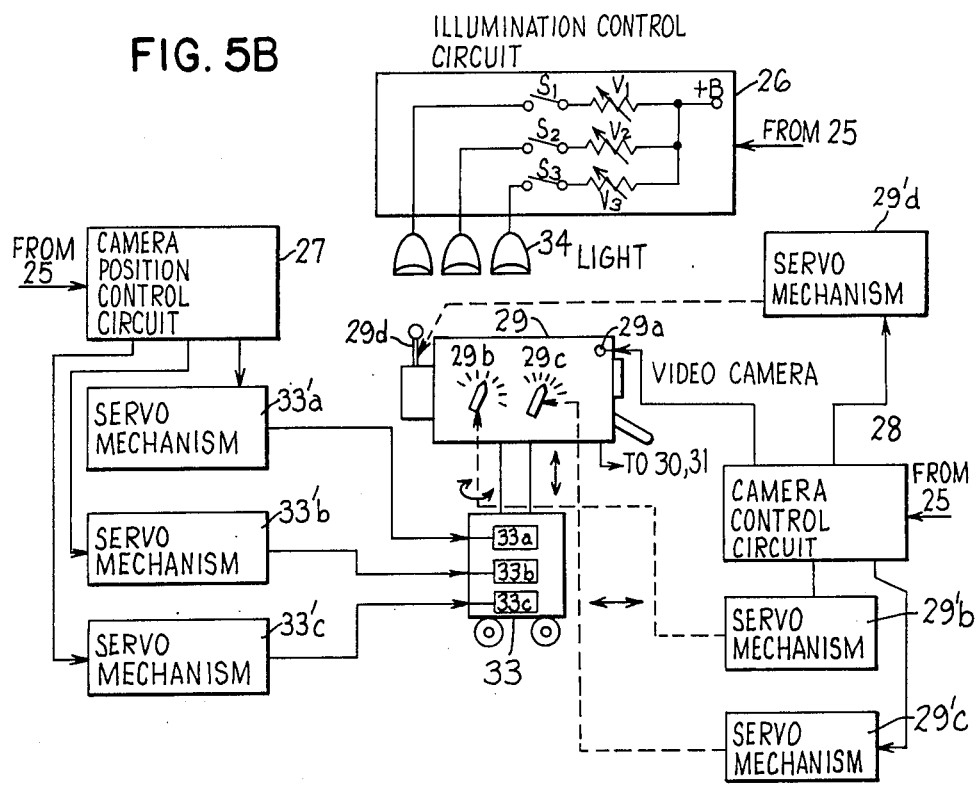

FIGS. 5A and 5B show an embodiment of the self-control TV system according to the invention employing the ATR equipment described in the above. Reference numeral 21 designates a videotape recorder (hereinafter called "VTR" apparatus) for recording video and audio signals outputted from a video camera 29 which is automatically operated by self-control signals to take a desired series of pictures as will be described later, and reference numeral 22 denotes a video monitor connected to a video signal output terminal OUT$_1$ of the VTR apparatus 21. Reference numeral 23 refers to an audio monitor connected to an audio signal output terminal OUT$_2$ of the VTR apparatus 21, 24 to a decoder connected to a self-control signal output terminal OUT$_3$ of the ATR apparatus 1, and 25 to a microcomputer. A video camera device consists of an illumination control circuit 26, a camera position control circuit 27, a camera control circuit 28 and the video camera 29. A suitable commercial camera is for example the Ampex VTR3000.

Reference numeral 30 refers to a mixing circuit, 31 designates a switcher, and 32 denotes an audio monitor device connected to an audio signal output terminal OUT4 of the ATR apparatus 1.

The video camera 29 is of a known auto-focusing type including a motor-driven auto-zooming mechanism to automatically perform a zooming function when an auto-focusing signal terminal 29a receives an auto-focusing signal (a signal which instructs the start or end of the zooming operation). The video camera 29 has a color temperature switching knob 29b and a white balance adjusting knob 29c for adjusting the color tone and chroma of the pictures. These knobs are driven respectively by electrical servomechanisms 29b' and 29c'. Reference numeral 29d designates a lens aperture control lever driven by an electrical servomechanism 29d' and 29c'. Reference numeral 29d designates a lens aperture control lever driven by an electrical servomechanism 29d' to change the aperture diameter of the lens.

The video camera 29 is supported by a support board 33 having mechanisms 33a, 33b and 33c to move the video camera back and forth, up and down, and right and left as known and used in broadcasting stations, etc. The back and forth movement mechanism 33a, right and left movement mechanism 33b and up and down movement mechanism 33c are driven by electrical servomechanisms 33a', 33b' and 33c', respectively.

The illumination control circuit 26 is connected to a plurality of lamps 34—34 with different colors, and includes switches S1 through S3, volumes V1 through V3, etc. for selectively turning on and off the lamps or selectively changing the brightness of the lamps.

The camera position control circuit 27 is connected to the electrical servomechanisms 33a' through 33c' to supply them with instruction signals for instructing back and forth, right and left or up and down movement of the video camera 29.

The camera control circuit 28 is connected to the electrical servomechanisms 29b', 29c' and 20d' and terminal 29a to supply the mechanisms with instruction signals for instructing them to drive the respective knob or lever 29b, 29c and 29d and to supply the terminal 29a with an auto-focusing signal.

The decoder circuit 24 has a circuit arrangement shown in FIG. 4 and is connected between the ATR apparatus 1 and the input of microcomputer 25. The microcomputer 25 is connected to the illumination control circuit 26, camera position control circuit 27, camera control circuit 28 and switcher 31.

The switcher 31 has input terminals 31a, 31b and 31c selectively connected to an output terminal 31d which is connected to an input terminal IN3 of the VTR apparatus 21.

The output of the video camera 29 is connected to one of input terminals of the mixing circuit 30 and to the input terminal 31b of the switcher 31, and an input terminal IN5 is connected to the other input terminal of the mixing circuit 30 and to the input terminal 31a of the switcher 31.

Attention is directed to the operation of the above-described apparatus. As described before, predetermined self-control signals are recorded on a tape in the ATR apparatus by the method shown in FIG. 2. The self-control signals are necessary for video signal recording of a series of pictures which change in a predetermined stepped manner.

When the ATR apparatus 1 is activated, the self-control signals on the tape are reproduced and outputted from the output terminal OUT3 to the decoder circuit 24.

The decoder circuit 24, as described before, converts the self-control signals (analog signals) into digital signals suitable for the input condition of the microcomputer 25 and applies the digital signals to the microcomputer 25.

In response to the digital signals, the microcomputer 25 gives required digital control signals to the illumination control circuit 26, camera position control circuit 27 and camera control circuit 28 in accordance with a predetermined program. The control signals serve to activate adjusting functions of color tone, chroma, brightness, iris, video zoom, focus, picturing angle, camera position and illumination for each picture to be taken. For example, the camera control circuit 28, on reception of the control signal, drives the electrical servomechanisms 29b' and 29c' to adjust the color temperature adjusting knob 29b and white balance adjusting knob 29c to select the most suitable color tone and chroma for each picture. The circuit 28 also drives the electrical servomechanism 29d' to adjust the lens aperture lever 29d to select the most suitable brightness and iris for the picture.

For zooming and focusing functions, the camera control circuit 28 gives an auto-focusing signal to the terminal 29 a of the video camera 29 and makes it perform an auto-focusing operation.

The camera position control circuit 27, on reception of the control signal, drives the respective servomechanisms 33a' through 33c' to cause them to move the video camera 29 on the base board 33 to the best angle or position.

The illumination control circuit 26, on reception of the control signal, turns on or off the lamps 34—34 or adjusts the brightness of the lamps.

Video signals outputted from the video camera 29 under the aforegoing various controls are applied to the switcher 31 and mixing circuit 32.

The input terminal IN5 may be supplied with video signals from another video camera or VTR not shown. In response to the signal from the microcomputer 25, the switcher 31 selects the video signals received by the input terminal IN5 or mixture signals of both video signals and applies them to the video signal input terminal IN3 of the VTR apparatus 1.

Thus, the video signals and the audio signals are recorded on predetermined tracks of a video tape employed in the VTR apparatus 21.

The image and the sound corresponding to the video and audio signals can be monitored by the video monitor 22 attached to the VTR apparatus 21 and the audio monitors 23 and 32 attached to the VTR apparatus 21 and to the ATR apparatus 1. The output terminal OUT$_1$, OUT$_2$ and OUT$_3$ may each consist of plural output terminals so as to enable recording by other VTR and ATR apparatuses, too.

The video camera device may include two or more cameras so as to actuate them selectively in response to the self-control signals or to reproduce divided plural images or overlapping plural images on a same screen.

Next, another embodiment of the invention will be described hereunder wherein the self-control signals are recorded by a VTR apparatus.

Figure 6:
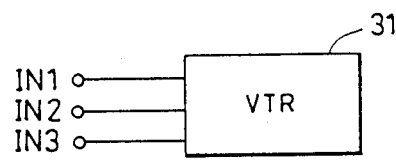
FIG. 6 is a block diagram showing the videotape recording (VTR) apparatus.

FIG. 6 shows a VTR apparatus 31 to be employed in the embodiment. The VTR apparatus 31 has an audio signal input terminal IN$_1$, a control signal (self-control signal) input terminal IN$_2$ and a video signal input terminal IN$_3$.

The VTR 31 includes an extra head in addition to a normal video head to use the extra head to record or reproduce self-control signals entered in the terminal IN2.

Audio signals, self-control signals and video signals are recorded on predetermined tracks of a videotape. The respective signals may occupy plural tracks. The self-control signals are employed to control a video camera and control circuits associated to the video camera and are previously recorded on a track or tracks of a videotape.

Figure 7:
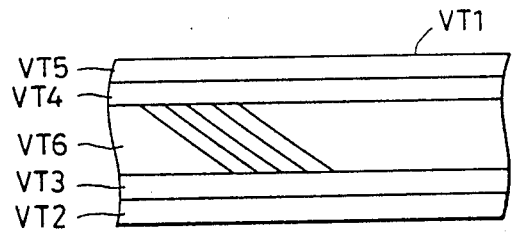
FIG. 7 shows tracks of a videotape.

FIG. 7 shows an example of videotape including tracks on which said respective signals are recorded. A videotape VT1 has audio tracks VT2 and VT3, a servo control signal (tape speed control signal) track VT4 and a self-control signal track VT5 to record respective signals thereon by fixed heads not shown of the VTR device 31. The videotape VT1 also has a video signal track zone to record video signals thereon by a rotatable head not shown of the VTR apparatus 31.

Record and reproduction of the self-control signals on and from a videotape are enabled by converting a series of digital signals "1" and "0" into a frequency variation including two kinds of frequencies.

Alternatively, other digital recording methods such as NRZ (nonreturn-to-zero) and MFM (modified FM), for example, may be employed.

Figure 8:
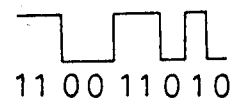
FIGS. 8(a) and 8(b) show an example of signal conversion.
Figure 8:
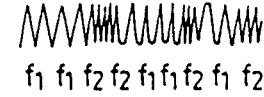

An example of the signal conversion is shown in FIG. 8. The "1" level and "0" level of the digital signals of FIG. 8(a) are converted to the f$_1$ Hz signal and the f$_2$ Hz signal of FIG. 8(b), respectively.

Figure 9:
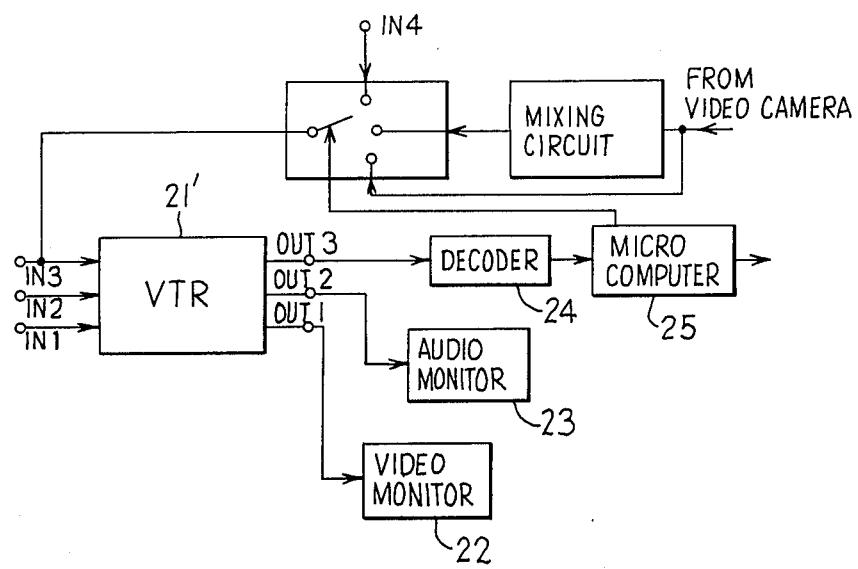
FIG. 9 is a block diagram generally showing an embodiment of the self-control TV system employing the VTR apparatus of FIG. 6.

FIG. 9 shows an embodiment of the self-control TV system including the above-introduced VTR apparatus. The VTR apparatus 21' includes a video signal output terminal OUT$_1$ connected to a video monitor 22 and includes an audio signal output terminal OUT$_2$ connected to an audio monitor 23. The VTR apparatus 21' also includes a self-control signal output terminal OUT$_3$ connected to a decoder 24. Since the circuit arrangement of the embodiment from the microcomputer 25 and the mixing circuit 32 is the same as the arrangement of FIG. 5B, redundant drawing and explanation are omitted here.

As described in the above, the TV system according to the invention comprises the audio tape recording apparatus, the videotape recording apparatus and the video camera device including the video camera and the associated control circuits so that the video camera device is controlled by signals reproduced by the audio tape recording apparatus or by the videotape recording apparatus, whereby signals outputted from the well controlled video camera device are recorded by the videotape recording apparatus. Therefore, it is possible to record video signals in a process similar to a technique employed for production of programs by a normal TV broadcasting station or recorded video tapes on the market, and to record audio signals at the same time. Thus, even an amateur can produce such an image based on a polished photographic sense and technique that the audience can fully enjoy the emage.

What is claimed is:

1. A self-control television system comprising:
   an audio tape recorder having an audio tape which has prerecorded thereon self-control signals necessary for control of video signal recording of a series of pictures changing in a predetermined stepwise manner;
   a video tape recorder;
   an auto-focusing video camera having a color temperature switching member and a white balance adjusting member;
   a video camera position control means for moving said video camera vertically and horizontally;
   a video camera control means for controlling the color temperature switching member and white balance adjusting member of said video camera;
   an illumination control means including a plurality of lamps with different colors associated with said camera for selectively turning on and off and adjusting brightness of said lamps;
   a microcomputer having output means for outputting control signals to said video camera position control means, video camera control means and illumination control means for controlling same;
   a decoder means for converting said self-control signals reproduced by said audio tape recorder into a digital signal and entering it in said microcomputer, said microcomputer being responsive to said digital signal to output said control signals to said individual ones of said control means; and
   a video signal entering means for entering video signals from said video camera in said video recorder and therewith for recording said series of pictures.

2. A television system of claim 1 further comprising an input terminal for reception of video signals from another video camera or another video tape recorder, a mixing means for mixing said video signals received by said input terminal with said video signals from said video camera, and a switcher connected to said input terminal, mixing means and video camera, said switcher being controlled by said microcomputer to selectively extract output signals from said input terminal, video camera and mixing means.

3. A self-control television system comprising:
   a video tape recorder having a video tape which has prerecorded thereon self-control signals necessary for control of video signal recording of a series of pictures changing in a predetermined stepwise manner;

an auto-focusing video camera having a color temperature switching member and a white balance adjusting member;

a video camera position control means for moving said video camera vertically and horizontally;

a video camera control means for controlling the color temperature switching member and white balance adjusting member of said video camera;

an illumination control means including a plurality of lamps of different colors associated with said video camera for selectively turning on and off and adjusting brightness of said lamps;

a microcomputer having output means for outputting control signals to said video camera position control means, video camera control means and illumination control means for controlling same;

a decoder means for converting said self-control signals reproduced by said video tape recorder into a digital signal and entering it in said microcomputer, said microcomputer being responsive to said digital signal to output said control signals to individual ones of said control means; and a video signal entering means for entering video signals from said video camera in said video tape recorder and therewith for recording said series of pictures.

4. A television system of claim 3 further comprising an input terminal for reception of video signals from another video camera or another video tape recorder, a mixing means for mixing said video signals received by said input terminal with said video signals from said video camera, and a switcher connected to said input terminal, mixing means and video camera, said switcher being controlled by said microcomputer to selectively extract output signals from said input terminal, video camera and mixing means.

* * * * *